(12) United States Patent
Bonner

(10) Patent No.: US 11,311,126 B2
(45) Date of Patent: Apr. 26, 2022

(54) UTENSIL

(71) Applicant: Mark Bonner, Frenchtown, NJ (US)

(72) Inventor: Mark Bonner, Frenchtown, NJ (US)

( * ) Notice: Subject to any disclaimer, the term of this patent is extended or adjusted under 35 U.S.C. 154(b) by 0 days.

(21) Appl. No.: 16/080,010

(22) PCT Filed: Feb. 27, 2017

(86) PCT No.: PCT/US2017/019722
§ 371 (c)(1),
(2) Date: Aug. 26, 2018

(87) PCT Pub. No.: WO2017/147592
PCT Pub. Date: Aug. 31, 2017

(65) Prior Publication Data
US 2019/0150644 A1 May 23, 2019

Related U.S. Application Data

(60) Provisional application No. 62/300,098, filed on Feb. 26, 2016.

(51) Int. Cl.
*A47G 21/02* (2006.01)
*A47L 13/08* (2006.01)
*A47J 43/28* (2006.01)
*B01F 15/00* (2006.01)

(52) U.S. Cl.
CPC .......... *A47G 21/023* (2013.01); *A47J 43/281* (2013.01); *A47L 13/08* (2013.01); *B01F 15/00* (2013.01)

(58) Field of Classification Search
CPC ...... A47G 21/023; B01F 15/00; A47J 43/281; A47L 13/08

USPC ................................. 30/218, 129, 323, 327
See application file for complete search history.

(56) References Cited

U.S. PATENT DOCUMENTS

| 510,286 | A | * | 12/1893 | Osterman | |
|---|---|---|---|---|---|
| 1,065,433 | A | * | 6/1913 | Dow et al. | ........... A47G 21/023 30/129 |
| 1,255,945 | A | * | 2/1918 | Stimecz | ............... A47G 21/023 30/129 |

(Continued)

FOREIGN PATENT DOCUMENTS

GB      2 338 403 B   * 11/2000

*Primary Examiner* — Hwei-Siu C Payer
(74) *Attorney, Agent, or Firm* — Johnson & Martin, P.A.; James David Johnson

(57) ABSTRACT

A utensil comprises a main body having a handle and a receptacle. A resilient arm has a curved flexible portion and is operatively connected to the main body to be movable between a rest configuration and an extended configuration whereat the curved portion is less curved than in the extended configuration. A remover is operatively connected to the resilient arm in substance disengaging relation with respect to the receptacle. A trigger operatively mounted on the main body for movement between a rest position corresponding to the rest configuration of the resilient arm and an actuating position corresponding to the extended configuration of the resilient arm. In use, movement of the trigger from the rest position to the actuating position causes extension of the resilient arm from the rest configuration to the extended configuration to thereby moving the remover in substance disengaging relation with respect to the receptacle.

18 Claims, 3 Drawing Sheets

(56) References Cited

U.S. PATENT DOCUMENTS

| | | | | |
|---|---|---|---|---|
| 1,432,108 | A * | 10/1922 | Alexander | A47G 21/02 30/129 |
| 2,430,242 | A * | 11/1947 | Nichols | A47G 21/023 30/129 |
| 2,730,802 | A * | 1/1956 | Ciaglia | A47G 21/023 30/129 |
| 3,233,325 | A * | 2/1966 | Perry | A47J 43/283 30/129 |
| 6,584,692 | B1 * | 7/2003 | Stills | A47J 43/283 294/99.2 |
| 8,474,143 | B2 * | 7/2013 | Wedderburn | A47G 21/02 30/128 |
| 8,584,366 | B2 * | 11/2013 | Wedderburn | A47G 21/023 30/128 |
| 2014/0250698 | A1 * | 9/2014 | Lord | A47G 21/02 30/327 |
| 2019/0150644 | A1 * | 5/2019 | Bonner | A47G 21/023 |

* cited by examiner

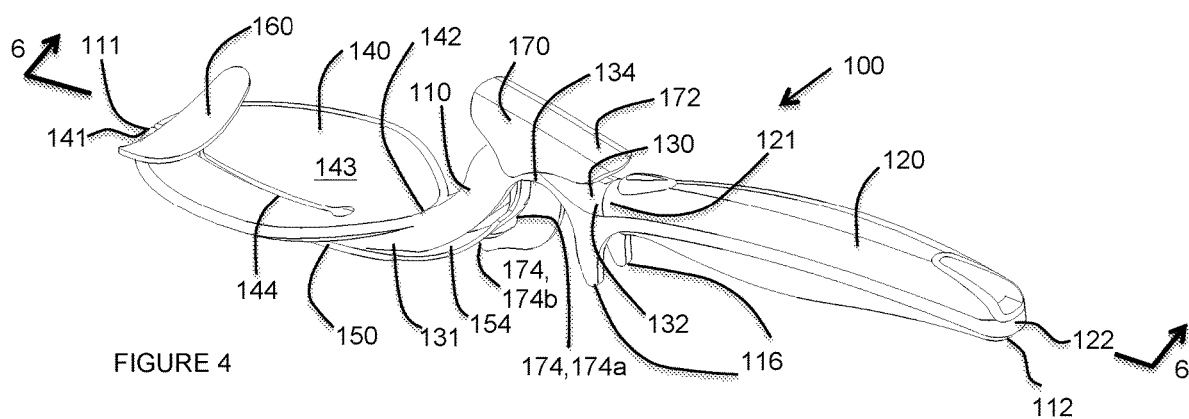

UTENSIL

FIELD OF THE INVENTION

The present invention relates to utensils, and more particularly to serving utensils.

BACKGROUND OF THE INVENTION

There are a number of different utensils used in the preparation, manipulation and service of food such as knives, forks, spoons, spatulas, and so on. Such utensils can additionally or also be used for other commercial and residential purposes, such as, perhaps gardening. In order for such utensils to be properly suited to various tasks, they are readily available in many shapes and sizes.

Many types of serving utensils exist, especially for the serving of food. Typically, such utensils have some sort of receptacle or food receiving member and a manually actuateable remover member to remove food from the receptacle or food receiving member.

One such serving utensil can be found in U.S. Pat. No. 8,584,366 issued Nov. 19, 2013, to Wedderburn et al, and entitled Utensil. This utensil comprises a handle having a gripping portion that is gripped by the user. A serving receptacle is operatively connected to the handle. There is mounted to the serving utensil a serving scraper having a resilient arm with a bowed shape. The resilient arm has a scraping end and a mounting end. A mounting means at the mounting end is for mounting the resilient arm to the serving utensil forwardly of the gripping portion of the utensil used to grip the utensil and rearwardly of the serving receptacle. A scraper-remover is disposed at the scraper end of the resilient arm so that food can be scraped off of the food receptacle of the utensil when the serving scraper is actuated by the user. Pressing forwardly on the rear portion of the bowed shape of the resilient arm creates an amplified forward movement of the serving scraper, thereby making it easy to serve food from the serving receptacle. Even though this prior art serving utensil works well, it is been found that the lack of an independent trigger somewhat precludes the amplified forward movement of the serving scraper from being maximized.

It is an object of the present invention to provide a utensil that can be used for serving food.

It is another object of the present invention to provide a serving utensil made up of a minimum number of components (i.e. a utensil body formed of a unitary piece of material, trigger formed of a unitary piece of material and resilient member formed of a unitary piece of material)

It is another object of the present invention to provide a line of serving utensils where the components (i.e. utensil body, trigger, resilient member etc.) are interchangeable.

It is another object of the present invention to provide a utensil which is not fastened together wherein the components (i.e. utensil body, trigger, resilient member etc.) are easily and quickly disconnected for cleaning.

It is an object of the present invention to provide added functionality to utensils, (i.e spoons, forks spatulas, tools and other implements), which may enable better control of substances, (i.e. food or items being manipulated during use). Wherein a utensil may be a mechanical device for the remote handling of objects or materials in conditions not permitting the direct interaction of an individual.

It is an object of the present invention to provide an ability to hold on to a substance such as food as well as the ability to dislodge and or push the substance from the service end (i.e. receptacle, manipulating end etc.).

It is an object of the present invention to provide a pusher or scraper, which could be actuated to dislodge food from the service end of a utensil It is another object of the present invention to provide a pusher/scrapper that may push like a plow or may act like a blade which may slide under a substance to free is from the service end It is another object of the present invention to provide an actuator such as a finger-actuated trigger, which can move the pushing/scraping feature, an amount, which is greater than the movement of the trigger itself It is another object of the present invention to provide a design, which is easy to assemble and disassemble so that the utensil can be properly cleaned when need be.

It is another object of the present invention to provide a snap together design, which can be quickly and easily assembled on the assembly line during production.

It is another object of the present invention to provide a utensil that is easy to manufacture.

It is another object of the present invention to provide a utensil that is lightweight.

It is another object of the present invention to provide a utensil that is convenient to use.

SUMMARY OF THE INVENTION

In accordance with one aspect of the present invention there is disclosed a novel utensil comprising a main body having a handle and a receptacle. A resilient arm has curved flexible portion and is operatively connected to the main body to be movable between a rest configuration and an extended configuration whereat the curved flexible portion is less curved than in the rest configuration. A remover is operatively connected to the resilient arm in substance disengaging relation with respect to the receptacle. A trigger operatively mounted on the main body for movement between a rest position corresponding to the rest configuration of the resilient arm and an actuating position corresponding to the extended configuration of the resilient arm. In use, movement of the trigger from the rest position to the actuating position causes extension of the resilient arm from the rest configuration to the extended configuration to thereby moving the remover in substance disengaging relation with respect to the receptacle.

In accordance with one aspect of the present invention there is disclosed a novel utensil comprising a unitary main body having a handle and a receptacle. A unitary resilient arm and remover are operatively connected to the main body for movement between a rest configuration and an extended configuration. A unitary trigger is operatively mounted on the main body for movement between a rest position corresponding to the rest configuration of the resilient arm and an actuating position corresponding to the extended configuration of the resilient arm. In use, movement of the trigger from the rest position to the actuating position causes extension of the resilient arm from the rest configuration to the extended configuration to thereby moving the remover in substance disengaging relation with respect to the receptacle.

In accordance with one aspect of the present invention there is disclosed a novel utensil comprising a handle and a receptacle securely connected to the handle. A resilient arm has a mounting end and an opposite end. The mounting end is operatively connected in hinged relation to one of the handle and receptacle. The resilient arm comprises a curved flexible portion having a rest configuration and a flexed configuration whereat the flexed configuration increases the distance between the mounting end and the opposite end. A remover is operatively connected to the opposite end of the resilient arm and disposed adjacent the receptacle. A trigger comprises an arm contacting portion is connected in hinged relation to the handle wherein the trigger has a rest position and an actuated position wherein when the trigger is in the actuated position the arm contacting portion causes the resilient arm to flex. The hinged movement of the trigger cause movement of the remover relative to the receptacle.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

BRIEF DESCRIPTION OF THE DRAWINGS

The novel features which are believed to be characteristic of the utensil according to the present invention, as to its structure, organization, use and method of operation, together with further objectives and advantages thereof, will be better understood from the following drawings in which a presently described embodiment of the invention will now be illustrated by way of example. It is expressly understood, however, that the drawings are for the purpose of illustration and description only, and are not intended as a definition of the limits of the invention. In the accompanying drawings:

FIG. 4 is a perspective view from the rear of the first illustrated embodiment of the utensil of FIG. 1, but with the resilient arm in the extended configuration;

FIG. 5 is a side elevational view of the first illustrated embodiment of the utensil of FIG. 4, with the resilient arm in the extended configuration;

FIG. 6 is a cross-sectional side elevational view of the first illustrated embodiment of the utensil of FIG. 1, taken along section line 6-6 in FIG. 4, with the resilient arm in the extended configuration;

Figure 1:
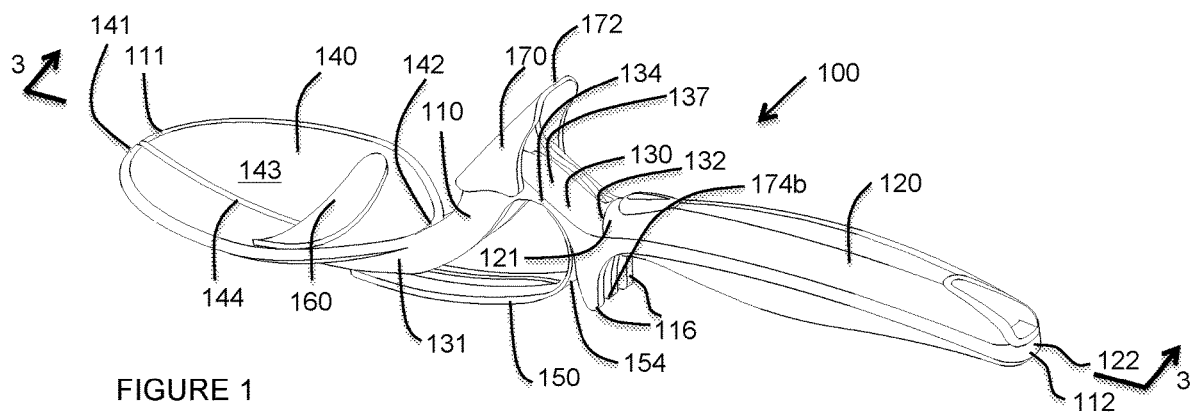
FIG. 1 is a perspective view from the rear of a first illustrated embodiment of the utensil according to the present invention, with the resilient arm in the rest configuration.

LIST OF PARTS AND REFERENCE NUMERALS 100 utensil
110 main body
111 service end
112 holding end
116 downwardly extended portions
116a forwardly facing retaining surfaces
120 handle
121 front end
122 back end
130 interconnecting portion
131 front end
132 back end
133 roof portion
134 left side wall portion
135 right side wall portion
136 lateral axle
137 upwardly projecting top portion
138 top reverse curved portion
139 short rear portion
140 receptacle
141 front end
142 back end
143 top surface
144 fore-aft slot
146 bottom of the fore-aft slot
150 resilient arm
151 mounting end
152 free end
153 front portion
154 curved flexible portion
154r rearwardly facing surface
155 elongate forward portion
160 remover
170 trigger
172 thumb engageable portion
171 arm contacting extension
174 arm contacting portion
174a first arm contacting portion
174b second arm contacting portion
200 utensil/fork
240 receptacle
244 fore-aft slot
248 prongs
300 clasp configuration
310 container
"A" arm pivot axis
"T" arm pivot axis

DETAILED DESCRIPTION OF THE ILLUSTRATED EMBODIMENTS

Figure 7:
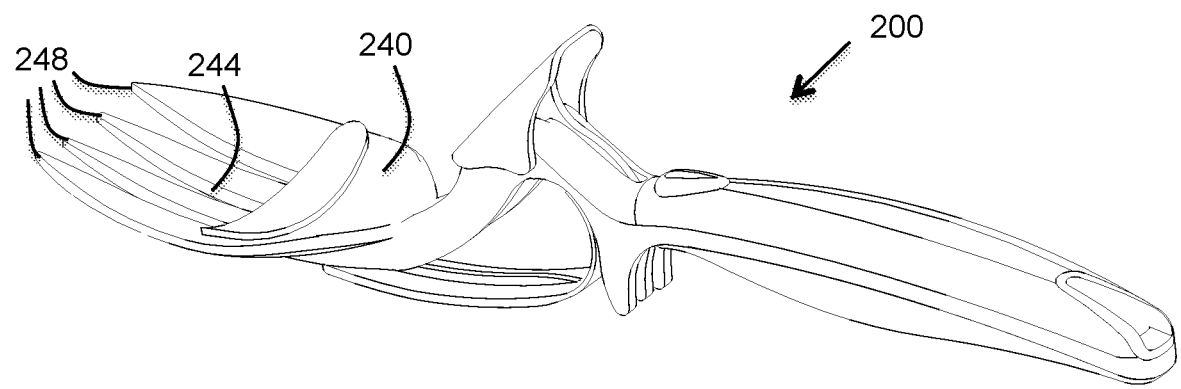
FIG. 7 is a perspective view from the rear of a second illustrated embodiment of the utensil according to the present invention, with the resilient arm in the rest configuration; and, FIG. 8 is a perspective view from the rear of the first illustrated embodiment of the utensil attached to the edge of a container.
Figure 8:
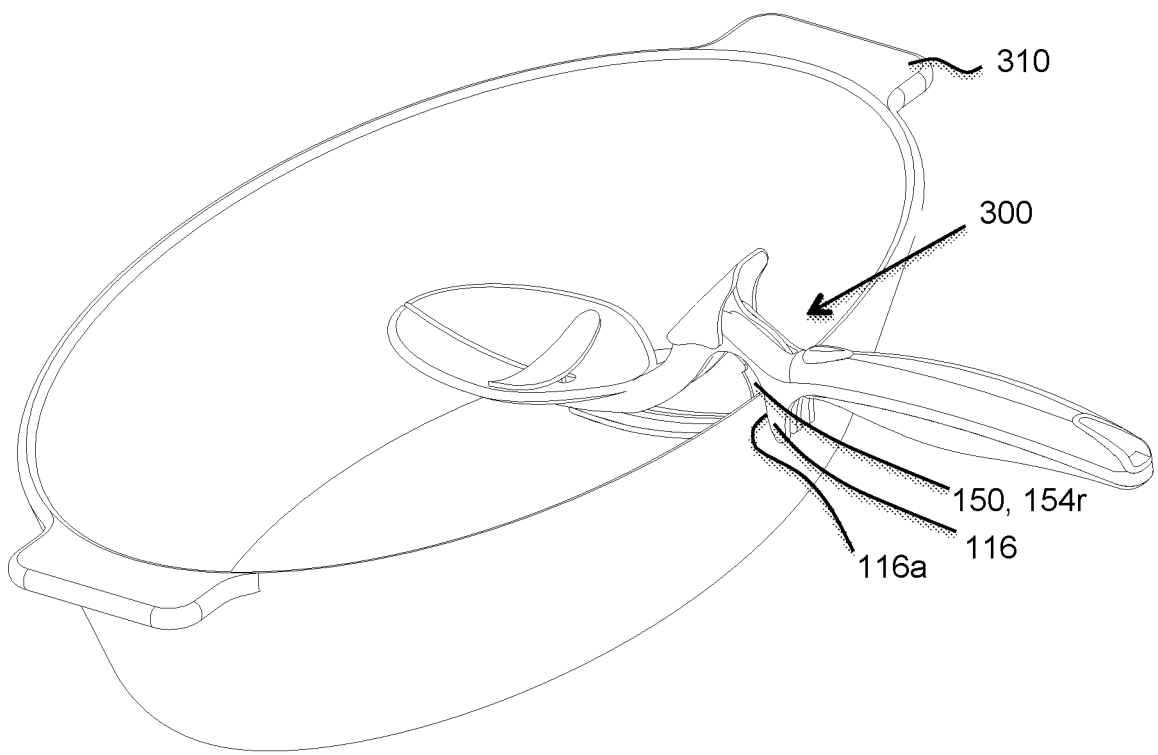

Referring to FIGS. 1 through 8 of the drawings, it will be noted that FIGS. 1 through 6 illustrate a first illustrated embodiment of the utensil according to the present invention, FIG. 7 illustrates a second illustrated embodiment of the utensil according to the present invention, and FIG. 8 illustrates the first illustrated embodiment of the utensil attached to the edge of a container Reference will now be made to FIGS. 1 through 6, which show a first illustrated embodiment of the utensil according to the present invention, as indicated by general reference numeral 100. The utensil 100 is for use in activity such as serving food, either in a home environment or a commercial environment, and also any other suitable activities.

In brief, the first illustrated embodiment utensil 100 comprises a main body 110 (having a handle 120, an interconnecting portion 130, and a receptacle 140), a resilient arm 150, a remover 160, and the trigger 170, that all work together to permit scooping up, spearing, or otherwise gathering, of a substance, such as food, onto the receptacle 140 and subsequent disengaging of the substance with respect to the receptacle 140, so that the substance is served or otherwise placed, in a desired location, such as a bowl, plate, platter, and so on. The first illustrated embodiment utensil 100 is a spoon, but could be any other suitable type of utensil.

More specifically, the first illustrated embodiment utensil 100, which is a type of substance manipulator, comprises a main body 110 having a handle 120, an interconnecting portion 130, and a receptacle 140. The handle 120 and the receptacle 140 are securely interconnected one to the other by the interconnecting portion 130. As can be readily seen in the Figures, the handle 120 extends between a front end 121 and back end 122 and is ergonomically shaped and slightly curved, so as to be comfortable and easily manipulable, with the lower portion of the handle 120 being made from or least covered with a reasonably high friction material, such as synthetic rubber, or suitable plastic material, or the like, in order to provide a better grip for a user's hand.

In the first illustrated embodiment utensil 100, the receptacle 140 extends between a front end 141 and back end 142 and is shaped generally in the curved shape of the receptacle 140 of the spoon type utensil 100, although any other suitable receptacle 140 can be used, such as a fork, spatula, measuring cup, and so on. The receptacle 140 also comprises a fore-aft slot 144, with an open end at the front end 141 of the receptacle 140 and a bottom end 146 towards the back end 142 of the receptacle 140. The fore-aft slot 144 is also known as a longitudinal slot 144, extending inwardly and rearwardly from the front end 141 of the receptacle 140 where a portion of the resilient arm 150 is received in the fore-aft slot 144. The fore-aft slot 144 receives a front portion 153 of the resilient arm 150 in sliding relation therein, as will be described in greater detail subsequently.

Further, the first illustrated embodiment utensil 100 comprises the interconnecting portion 130 that securely interconnects the handle 120 and the receptacle 140 one to the other. The interconnecting portion 130 extends between a front end 131 and a back end 132. The front end 131 of the interconnecting portion 130 is securely connected to and preferably integrally formed with the back end 142 of the receptacle 140, and the back end 132 of the interconnecting portion 130 is securely connected to and preferably integrally formed with the front end 121 of the handle 120. Preferably, the trigger 170 is operatively mounted on, at or to the interconnecting portion 130 and the resilient arm 150 is operatively connected on, at or to the interconnecting portion 130.

In the first illustrated embodiment utensil 100, the interconnecting portion 130 is in the shape of a compound curve and curves gently upwardly from the back end 142 of the receptacle 140 to an upwardly projecting top portion 137. As can be readily seen, the upwardly projecting top portion 137 comprises a top reverse curved portion 138 that is convexly curved upwardly to present at suitable location for mounting of the trigger 170 and the resilient arm 150, as will be described in greater detail subsequently. A short rear portion 139 of the interconnecting portion 130 extends downwardly from the top reverse curved portion 138 to the handle 120. The trigger 170 is operatively mounted on the upwardly projecting top portion 137 of the interconnecting portion 130 and the resilient arm 150 is operatively connected to the upwardly projecting top portion 137 of the interconnecting portion 130. One skilled in the art will recognize that alternate embodiments and alternative configurations may not need to be as curved and contoured.

The interconnecting portion 130 comprises a roof portion 133, and a left side wall portion 134 and a right side wall portion 135 each depending downwardly from the roof portion 133. The interconnecting portion 130 also has a lateral axle 136 securely connected to and spanning between the left side wall portion 134 and a right side wall portion 135. The lateral axle 136 receives the mounting end 151 of the resilient arm 150.

Preferably, for the sake of ease of manufacturing and minimizing manufacturing costs, and for the sake of strength and durability, among other reasons, the handle 120, the interconnecting portion 130, and the receptacle 140 are all integrally formed one with the other, and in the first illustrated embodiment utensil 100, are molded as one piece of plastic.

The first illustrated embodiment utensil 100 also comprises the resilient arm 150 extending between a mounting end 151 and an opposite free end 152, and having a curved flexible portion 154 and an elongate forward portion 155 extending forwardly from the curved flexible portion 154 to the receptacle 140. A substantial portion of the elongate forward portion 155 is generally straight and is oriented in its own fore-aft direction of movement.

It can also be readily seen in the Figures that the curved flexible portion 154 of the resilient arm 150 is convexly curved rearwardly, or in other words extends rearwardly from the arm pivot axis "A" towards the handle 120 and then curves downwardly to a generous first arcuate portion and then curves forwardly towards the receptacle 140 to the elongate forward portion 155 that is generally and/or substantially straight.

A short front portion 153 of the elongate forward portion 155 of the resilient arm 150 extends through the fore-aft slot 144 and travels in sliding relation therealong to move the remover 160 with respect to the receptacle 140, as will be described in greater detail subsequently.

Figure 2:
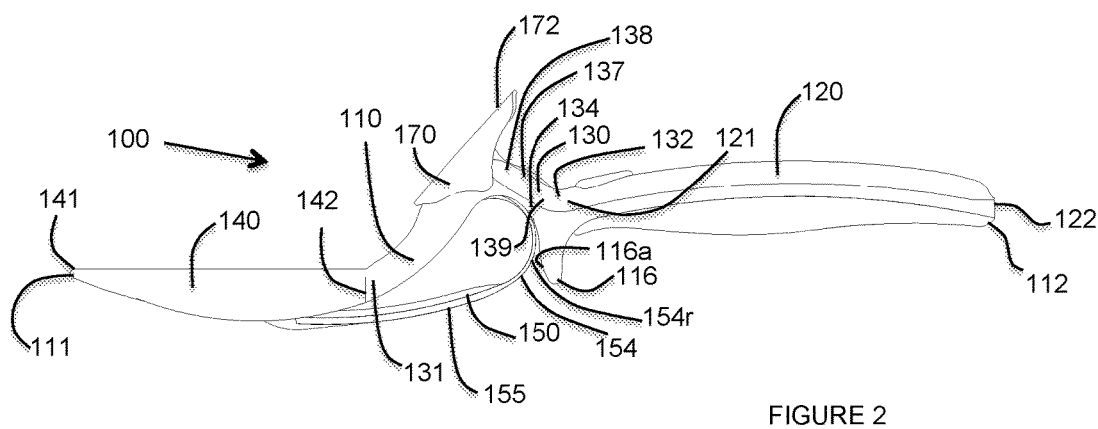
FIG. 2 is a side elevational view of the first illustrated embodiment of the utensil of FIG. 1, with the resilient arm in the rest configuration.
Figure 3:
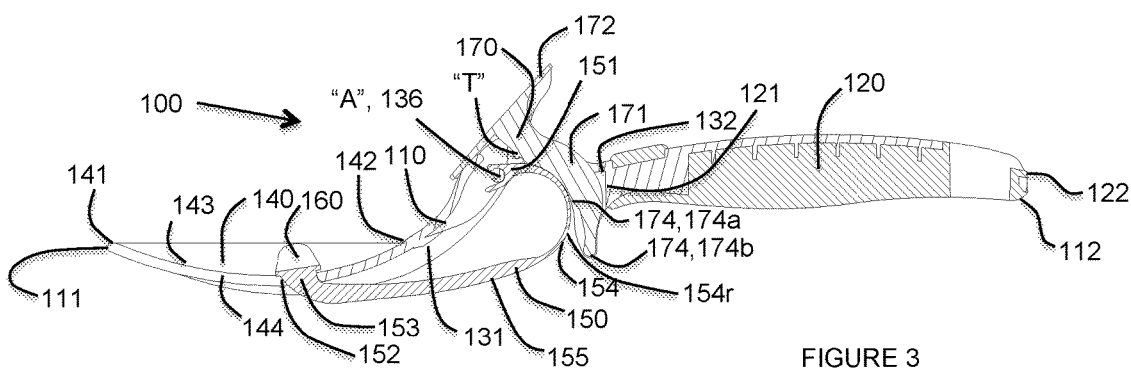
FIG. 3 is a cross-sectional side elevational view of the first illustrated embodiment of the utensil of FIG. 1, taken along section line 3-3 in FIG. 1, with the resilient arm in the rest configuration.

In the first illustrated embodiment utensil 100, the resilient arm 150 is operatively connected at the mounting end 151 to the main body 110 so as to be movable between a rest configuration, as can be best seen in FIGS. 1, 2 and 3, and an extended configuration, as can be best seen in FIGS. 4, 5 and 6. As can be readily seen, the curved flexible portion 154 has been flexed and is less curved in the extended configuration than in the rest configuration. It should be noted that the remover 160 moves generally and/or substantially linearly, which includes curvilinear motion, along the receptacle 140 when the resilient arm 150 is moved between the rest configuration and the extended configuration. The remover 160 could be considered as a blade or a scraper, depending on the particular design requirements.

More specifically, the resilient arm 150 is operatively connected at the mounting end in hinged relation for pivotal movement about an arm pivot axis "A" to the interconnecting portion 130 of the main body 110 such that the arm pivot axis "A" is raised above the level of the handle 120 and the receptacle 140. Such raised positioning permits the curved flexible portion 154 to be a useful size and curvature, and allows for proper interaction with the trigger 170, as will be discussed in greater detail subsequently.

In the first illustrated embodiment utensil 100, the remover 160 is operatively connected to the resilient arm 150, adjacent the opposite free end of the resilient arm 150 in substance disengaging relation with respect to the receptacle 140. Preferably, the remover 160 is integrally formed with the resilient arm 150 for the sake of ease of manufacturing, cost reduction, and so on, and in the first illustrated embodiment utensil 100, are molded as one piece of plastic.

In the first illustrated embodiment utensil 100, the trigger 170 is operatively mounted on the main body 110 for movement between a rest position, as can be best seen in FIGS. 1, 2 and 3, corresponding to the rest configuration of the resilient arm 150, and an actuating position, as can be best seen in FIGS. 4, 5 and 6, corresponding to the extended configuration of the resilient arm 150. As can be readily seen in the Figures, the trigger 170 has a thumb engageable portion 172, an arm contacting extension 171, an arm contacting portion 174 for contacting the curved flexible portion 154 of the resilient arm 150. In the first illustrated embodiment, the arm contacting portion 174 comprises a first arm contacting portion 174a and a second arm contacting portion 174b.

More specifically, the trigger 170 is operatively mounted in hinged relation for pivotal movement about a trigger pivot axis "T" to the interconnecting portion 130 of the main body 110 such that the trigger pivot axis "T" is raised above the level of the handle 120 and the receptacle 140. Such raised positioning permits generally downward arcuate movement of the thumb engageable portion 172 of the trigger 170, which accommodates the movement of a user's thumb in an ergonomic sense, and also permits the generally downwardly depending arm contacting portion 174 to move generally forwardly when the thumb engageable portion 172 is moved generally downwardly. As can be readily seen in the Figures, as the arm contacting portion 174 contacts the curved flexible portion 154 of the resilient arm 150 and moves it forwardly, the curved flexible portion 154 becomes less curved than in the rest configuration as it flexes to become straighter, until it reaches the extended configuration.

In the first illustrated embodiment utensil 100, the trigger pivot axis "T" and the arm pivot axis "A" are separated one from the other by a distance of about 5 mm, with the arm pivot axis "A" being disposed downwardly and forwardly with respect to the trigger pivot axis "T". This distance of separation of the trigger pivot axis "T" and the arm pivot axis "A" has been found to work well. It should be noted that other distances of separation of the trigger pivot axis "T" and the arm pivot axis "A" also work well. It should also be noted that having the trigger pivot axis "T" and the arm pivot axis "A" co-axially aligned would also work well. It can also be readily seen that the arm pivot axis "A" and the trigger pivot axis "T" are substantially parallel one to the other, which helps the trigger 170 and the resilient arm 150 to move in harmony one with the other.

More specifically, in the first illustrated embodiment utensil 100, the trigger 170 has a thumb engageable portion 172, a first arm contacting portion 174a for contacting the curved flexible portion 154 of the resilient arm 150 and a second arm contacting portion 174b for contacting the curved flexible portion 154 of the resilient arm 150 wherein the second arm contacting portion 174b is disposed further away from the trigger pivot axis "T" than the first arm contacting portion 174a. The distance (i.e radius one) from the trigger pivot axis "T" to the first arm contacting portion 174a of the trigger 170 is greater than the distance from the trigger pivot axis "T" to the thumb engaging portion of the trigger 170. The second arm contacting portion 174b is disposed even further from the trigger pivot axis "T" (i.e radius two) than the first arm contacting portion 174a. In other words the distance (i.e radius one) from the trigger pivot axis "T" to the first arm contacting portion 174a of the trigger 170 is less than the distance (i.e radius two) from the trigger pivot axis "T" to the second arm contacting portion 174b. The first arm contacting portion 174a of the trigger 170 contacts the curved flexible portion 154 of the resilient arm 150 during a first portion of movement of the trigger 170 from the rest position to the actuating position, and the second arm contacting portion 174b of the trigger 170 additionally contacts the curved flexible portion 154 of the resilient arm 150 during a second portion of the movement of the trigger 170 from the rest position to the actuating position, thus helping to extend the resilient arm 150 fully.

As can readily be seen in the Figures, the first arm contacting portion 174a of the trigger 170 comprises an outwardly protruding portion for contacting the curved flexible portion 154 of the resilient arm 150 and the second arm contacting portion 174b of the trigger 170 comprises an outwardly protruding portion for contacting the curved flexible portion 154 of the resilient arm 150. What can be also readily seen in the Figures is that the first arm contacting portion 174a alone would not have extend the resilient arm as far as the second arm contacting portion 174b has been able to.

In the first illustrated embodiment utensil 100, one very useful feature is that in the rest configuration of the resilient arm 150, at least one of the resilient arm 150 and the remover 160 is in contact with the receptacle 140, and the resilient arm 150 is thereby retained in a flexed state. Accordingly, the resilient arm 150 is securely retained in place. More specifically, the bifurcated attachment portion at the mounting end 151 of the resilient arm 150 is held in place in secure pivoting relation on the lateral axle 136.

In use of the first illustrated embodiment utensil 100, movement of the trigger 170 from the rest position to the actuating position causes extension of the resilient arm 150 from the rest configuration to the extended configuration to thereby moving the remover 160 in substance disengaging relation with respect to the receptacle 140. More specifically, when a user's thumb presses downwardly on the thumb engageable portion 172 of the trigger 170, the trigger 170 pivots about the trigger pivot axis "T" and the first arm contacting portion 174a of the trigger 170 moves forwardly to start to move (i.e flex, deform, straighten, and so on) the curved flexible portion 154 of the resilient arm 150, thereby starting to move the resilient arm 150 from the rest position to the extended position. As the user's thumb continues to press downwardly on the thumb engageable portion 172 of the trigger 170, the trigger 170 continues to pivot about the trigger pivot axis "T" and the second arm contacting portion 174b of the trigger 170 moves forwardly to continue to move (i.e. flex, deform, straighten, and so on) the curved flexible portion 154 of the resilient arm 150, thereby fully moving the resilient arm 150 from the rest position to the extended position. As can be readily seen, the arm contacting portion 174 travels (i.e. slides, rubs) along the curved flexible portion 154 of the resilient arm 150 as the trigger 170 moves from the rest position to the actuating position.

It should also be noted that the thumb engageable portion 172 of the trigger 170 moves between the rest position and the actuating position substantially transversely to the movement of the remover 160, thereby turning an ergonomic downward motion of the user's thumb on the thumb engageable portion 172 of the trigger 170 into the required forwardly extended motion of the remover 160 essentially converting rotational motion of the trigger 170 into substantially linear motion of the remover 160.

Another feature of the first illustrated embodiment utensil 100, the resilient arm 150 has a "bowl" engaging configuration 300 or clasp configuration 300 whereat the curved flexible portion 154 of the resilient arm 150 is disposed forwardly of the arm contacting portion 174 of the trigger 170, so as to form a gap there between for receiving the edge of a bowl of storage container there between.

In another aspect of the present invention, the utensil comprises a unitary main body 110 having a handle 120 and a receptacle 140. A unitary resilient arm 150 and remover 160 is operatively connected to the main body 110 for movement between a rest configuration and an extended configuration. A unitary trigger 170 is operatively mounted on the main body 110 for movement between a rest position corresponding to the rest configuration of the resilient arm 150 and an actuating position corresponding to the extended configuration of the resilient arm 150. In use, movement of the trigger 170 from the rest position to the actuating position causes extension of the resilient arm 150 from the rest configuration to the extended configuration to thereby moving the remover 160 in substance disengaging relation with respect to the receptacle 140.

In another aspect of the present invention, the utensil comprises a handle 120 and a receptacle 140 securely connected to the handle 120. The resilient arm 150 has a mounting end 151 and an opposite free end 152. The mounting end 151 of the resilient arm 150 is operatively connected in hinged relation to the lateral axle 136 of the interconnecting portion 130, as shown in FIG. 3. In various other embodiments, the mounting end 151 can be operatively connected in hinged relation to one of the handle 120 and receptacle 140. The resilient arm 150 comprises a curved flexible portion 154 having a rest configuration and a flexed configuration whereat the flexed configuration increases the distance between the mounting end 151 and the opposite end 152. The remover 160 is operatively connected to the opposite end 152 of the resilient arm 150 and disposed adjacent the receptacle 140. As shown in FIGS. 4 and 6, the trigger 170 includes the arm contacting portion 174 and is connected in hinged relation to the interconnecting portion 130, wherein the trigger 170 has a rest position and an actuated position. In various other embodiments, the trigger 170 is connected in hinged relation to the handle 120 wherein the trigger 170 has a rest position and an actuated position. When the trigger 170 is in the actuated position the arm contacting portion 174 causes the resilient arm 150 to flex. The hinged movement of the trigger 170 cause movement of the remover 160 relative to the receptacle 140.

Reference will now be made to FIG. 7, which shows a second illustrated embodiment of the utensil according to the present invention, as indicated by general reference numeral 200. The second illustrated embodiment of the utensil is similar to the first illustrated embodiment of the utensil 100 except that the utensil 200 is a fork instead of spoon wherein the receptacle 240 provides gaps between the prongs 248 which may act as a fore-aft slot 244.

The utensil 100, which is a type of substance manipulator, is for use to enable contact with and or offer better control of a substance, (i.e. food or items being manipulated during use). Wherein the utensil 100 may be a mechanical device for the remote handling of objects or materials in conditions where direct contact is undesirable and or in conditions where circumstances do not permit the direct interaction by an individual, such as in the case of temperature extremes, and so on. The utensil 100 may have the ability to hold on to a substance as well as the ability to dislodge, push and or remove the substance from a service end 111 of the receptacle 140 of the utensil 100.

Such a utensil 100 may have an actuator (the trigger 170) for moving a pushing feature (the remover 160) a certain distance where such a distance may not be convenient or ergonomic for the user to duplicate at the handle 120 of the manipulator. Therefore, it may be desirable to provide an actuator such as a manually operable trigger 170, which can move the pushing feature (the remover 160), an amount, which is greater than the movement of the trigger 170 itself. One way of accomplishing this amplified motion is to use the resilient arm 150.

A resilient member, such as a resilient arm 150 in combination with an actuator (the trigger 170) is one means to amplify a small amount of movement or motion (i.e. motion of a trigger 170) into a larger amount of movement or motion (i.e. motion of a remover 160). The trigger 170 may act on the resiliently curved flexible portion 154 of the resilient arm 150 to accomplish this amplified motion which is explained in further detail below. The amplified motion provided by such a combination maybe useful to devices such as utensils, tools, robotic legs, and so on.

In the preferred embodiment the substance manipulating device is the utensil 100 comprising the handle 120, receptacle 140, trigger 170, resilient arm 150 and remover 160. The trigger 170 may act on (i.e. push on) a resilient arm 150, which may cause it to straighten as it flexes. Additionally, a portion of the resilient arm 150 may rotate about the arm pivot axis "A" at lateral axle 136. The trigger 170 may flex, straiten and or rotate some or all of the resilient arm 150 in a number of ways. The trigger 170 may be connected directly to the mounting end 151 of the resilient arm 150, (i.e. hinge or axis of rotation, pivot, hub, and so on) wherein rotation of the trigger 170 by ninety (90) degrees would rotate the mounting end 151 of the resilient arm 150 by ninety (90) degrees. In the preferred embodiment the trigger pivot axis "T" would be positioned some place other than the arm pivot axis "A" of the resilient arm 150. In this embodiment, a portion of the trigger 170 (i.e. the arm contacting portion 174 also known as an extended surface 174) would act on (i.e. push on) the rearwardly facing surface 154r of the resiliently curved flexible portion 154 of the resilient arm 150 (i.e. the trigger 170 would act on the curved flexible portion 154 via one or more contact points such as the first arm contacting portion 174a and the second arm contacting portion 174b In an alternate embodiment the resilient arm 150 may also be considered to be a dynamic cam follower (i.e flexible resilient rocker arm, flexible resilient robotic leg), wherein in this alternate embodiment the trigger 170 may be substituted for by a rotating cam that engages the resilient arm 150 such as the trigger 170 does. The extended surface 174 on the trigger 170 would be comparable to the lobe on a cam, which interacts with a dynamic cam follower which in the present invention would be the same as or similar to the resilient arm 150. In this way a new, novel and unique type of "dynamic cam" action is created which may act to amplify the effects of a lobe on the cam.

In the preferred embodiment, the relation (i.e. arrangement) between the trigger pivot axis "T" location, the arm pivot axis "A" location, and also where the first arm contacting portion 174a and the second arm contacting portion 174b of the trigger 170 contacts the resilient arm 150 may be adjusted and varied to additionally customize the ratio of movement translated between the trigger 170 and the resilient arm 150 and the remover 160. The relationship of these three features (i.e. characteristics) may also be varied to adjust the leverage (i.e. mechanical advantage or mechanical disadvantage) that the trigger 170 has on the resilient arm 150 when the trigger 170 actuates the resilient arm 150.

The preferred embodiment has optimized the trigger 170 motion relative to the remover 160 motion to provide a reasonable amount of trigger 170 motion needed in order to move the remover 160 the required distance. As well, the design of the preferred embodiment provides leverage so as to require a reasonable (i.e. acceptable, comfortable etc.) amount of effort in order to actuate the trigger 170.

The contact between the first arm contacting portion 174a and the second arm contacting portion 174b of the trigger 170 with the rearwardly facing surface 154r of the curved flexible portion 154 of the resilient arm 150 may be a sliding engagement wherein the first arm contacting portion 174a and the second arm contacting portion 174b slides or rubs along (i.e. rubs against or over) the rearwardly facing surface 154r of the curved flexible portion 154 of the resilient arm 150 as the trigger 170 is actuated (i.e similar to a cam). The dynamics of this point contact interaction may vary greatly depending on the relative placements of the trigger pivot axis "T", arm pivot axis "A" and initial point of contact between the arm contacting portions 174a, 174b and the rearwardly facing surface 154r of the curved flexible portion 154 of the resilient arm 150, to be discussed in greater detail below.

In certain applications it may be advantageous to have the remover 160 positively located along the receptacle 140. In this case, the receptacle 140 and or resilient arm 150 may be provided with design characteristics such as a guide 144 (i.e. slots 144, tracks, rails, grooves, hole(s) etc.) in order to maintain the proper position throughout the range of motion.

In the preferred embodiment, the resilient arm 150 is positioned underneath the main body 110 where this design would require an opening (i.e. a slot 144) in the receptacle 140 so that the remover 160 can be position on the upper surface 143 of the receptacle 140 and be able to move throughout the complete range of motion.

Alternatively one skilled in the art will readily recognize that an alternate design of the remover 160 may be positioned properly and function in a similar capacity via a hole provided in the receptacle 140.

Additionally, one skilled in the art will readily recognize that in some instances the remover 160 may not need to be located on the upper surface 143 of the receptacle 140. For example, in the case of a fork 200 (See FIG. 7 of the second illustrated embodiment), the remover 160 may be located underneath the prongs 248 of the receptacle 240 and still function effectively at removing food from the prongs 248.

Another unique design feature of the present invention is the design of the pivotal connection at the trigger pivot axis "T" between the resilient arm 150 and the main body 110 of the utensil 100 (i.e. handle 120 and receptacle 140). The intention of the design is for ease of assembly and disassembly so as to provide a utensil 100 that is not fastened together so that the components (i.e. main body 110, trigger 170, and resilient arm 150) can be easily disconnected for properly cleaned when need be. This design additionally provides for quick and easy assembly during production on the assembly line.

The pivot design of the mounting end 151 of the resilient arm 150 functions similarly to a joint in a human or animal wherein the curved flexible portion 154 of the resilient arm 150 acts like a tendon, which provides the continuous tension and or compression that holds the joint together.

In the preferred embodiment there may be a main body 110 pivot feature 136 which is compatible with the bifurcated attachment portion at the mounting end 151 on the resilient arm 150. The force (i.e. tension or compression) holding this pivoting joint together may be provided by the resilient arm 150 wherein this force may result from a spring reaction force created in the resilient arm 150 once the resilient arm 150 has been installed in the main body 110. When installed, the resilient arm 150 may have been flexed such that an internal tension within the resilient arm 150 may now provide a compression force to be exerted between the bottom 146 of the fore-aft slot 144 on receptacle 140 and the main body 110 pivot feature 136 where this may act to hold the resilient arm 150 in place.

In the preferred embodiment the present invention also clearly shows a resilient arm 150 with a remover 160 design that slides underneath the food to help release it from a spoon style receptacle 140. This resilient arm 150 and the remover 160 design may also be used on a fork style receptacle 140. The same remover 160 design (or a similar blade design) may also be appropriate to push items from the prongs of a fork (such as the prongs 248 of the fork receptacle 240 shown in FIG. 7 of the second illustrated embodiment). In this way, all of the components of the utensil 100 may be similar and interchangeable.

Another structural benefit of the preferred embodiment is that the resilient arm 150 is mounted underneath the utensil 100. This design configuration may allow the utensil to rest on the resilient arm such that the receptacle 140 will be supported up off the surface of the table. This will prevent the receptacle 140 from picking up contamination from the table surface and or contaminating the table surface.

Another desirable feature for a manipulating device 100 such as the utensil 100 may be one which would allow it to be attached either loosely of securely to something in or around the workspace. Such a feature may act to preventing or inhibiting the manipulating device from being able to slide or move relative to where it had been placed further to this end a clip or clasp, which has the ability to hold on to (or grip) something typically found in and around the workspace may be desirable. This feature may require an actuatable feature biased to an initial position, which may act against a surface (or another feature) on the substance manipulating device 100.

The preferred embodiment the present invention shows the resilient arm 150 in cooperation with forwardly facing retaining surfaces 116a on the downwardly extended portions 116 on the main body 110, specifically on the interconnecting portion 130, which is provided to work with the resilient arm 150 so as to provide a clip feature, wherein a compression force is created between the resilient arm 150 and the forwardly facing retaining surfaces 116a so that these two cooperating features have the ability to grip onto the side of a container 310 such as casserole dish (and or a tray, pot, pan, storage container etc.) to hold the utensil 110 in place. One skilled in the art will readily recognize that the forwardly facing retaining surfaces 116a on the downwardly extended portions 116 on the main body 110 is not necessary in order to perform this function because the arm contacting portion 174 of the trigger may also serve the same purpose if the forwardly facing retaining surfaces 116a on the main body 110 were excluded. The forwardly facing retaining surfaces 116a on the downwardly extended portions 116 are included to serve this purpose and aesthetic purposes.

In an alternative embodiment, it is contemplated that the curved flexible portion of the curved in non-smooth, non-flowing shapes, and could even include sudden changes of direction, such as angles and so on.

As can be understood from the above description and from the accompanying drawings, the present invention provides a utensil that is inexpensive to manufacture, that is lightweight, that is easy to manufacture, that is convenient to use it is easy to hold, all of which features are unknown in the prior art.

Other variations of the above principles will be apparent to those who are knowledgeable in the field of the invention, and such variations are considered to be within the scope of the present invention. For instance, the light assembly could comprise something more similar to a light bulb, or alternatively could be made from flexible plastic to enable it to be placed on the arm, leg or torso of a person, for instance. Further, other modifications and alterations may be used in the design and manufacture of the light assembly of the present invention without departing from the spirit and scope of the accompanying claims.

I claim:

1. A utensil comprising:
a main body having a handle and a receptacle;
a resilient arm having a mounting end and an opposite end, wherein the mounting end is operatively connected in hinged relation to the main body, and wherein the resilient arm has a rest configuration and a flexed configuration, and wherein, in the flexed configuration, the distance between the mounting end and the opposite end increases;
a remover operatively connected to the opposite end of the resilient arm and disposed adjacent the receptacle; and,
a trigger connected in hinged relation to the main body for movement between a rest position corresponding to the rest configuration of the resilient arm and an actuating position corresponding to the flexed configuration of the resilient arm, and wherein the trigger comprises an arm contacting portion for slidably contacting the resilient arm;
wherein the hinged movement of the trigger causes the resilient arm to be in its flexed configuration, thereby causing movement of the remover relative to the receptacle.

2. The utensil of claim 1, wherein the resilient arm is connected to the main body, as aforesaid, for pivotal movement about an arm pivot axis.

3. The utensil of claim 2, wherein the trigger is connected to the main body, as aforesaid, for pivotal movement about a trigger pivot axis.

4. The utensil of claim 3, wherein the arm pivot axis and the trigger pivot axis are parallel or substantially parallel to each other.

5. The utensil of claim 3, wherein the arm pivot axis and the trigger pivot axis are separated.

6. The utensil of claim 3, wherein the arm contacting portion further comprises a first arm contacting portion and a second arm contacting portion, and wherein the second arm contacting portion is disposed further away from the trigger pivot axis than the first arm contacting portion.

7. The utensil of claim 2, wherein the resilient arm further comprises a curved flexible portion.

8. The utensil of claim 1, wherein the resilient arm further comprises a curved flexible portion wherein the arm contacting portion of the trigger travels along the curved flexible portion of the resilient arm as the trigger moves from the rest position to the actuating position.

9. The utensil of claim 8, wherein the main body further comprises an extended portion, configured to cooperate with the resilient arm wherein when the resilient arm is in the rest configuration the curved flexible portion of the resilient arm exerts a force on the extended portion of the main body.

10. The utensil of claim 1, wherein the resilient arm further comprises a curved flexible portion.

11. The utensil of claim 10, wherein the arm contacting portion rubs against the curved flexible portion of the resilient arm as it travels along the curved flexible portion of the resilient arm.

12. The utensil of claim 10, wherein the trigger causes the curved flexible portion of the resilient arm to straighten as the resilient arm is flexed.

13. The utensil of claim 10, wherein the curved flexible portion of the resilient arm travels along the arm contacting portion of the trigger as the trigger moves from the rest position to the actuating position.

14. The utensil of claim 1, wherein flexing of the resilient arm deforms the resilient arm.

15. The utensil of claim 1, wherein rotational motion of the trigger results in motion of the remover, wherein the motion of the remover is linear or about substantially linear.

16. The utensil of claim 1, wherein the receptacle comprises a fore-aft slot and a portion of the resilient arm is received in the fore-aft slot.

17. The utensil of claim 1, wherein the trigger further comprises a thumb engaging portion.

18. The utensil of claim 1, wherein the resilient arm is operatively connected in removable and replaceable relation to the main body.

* * * * *